US012792251B2

(12) United States Patent
Das et al.

(10) Patent No.: US 12,792,251 B2
(45) Date of Patent: Nov. 10, 2026

(54) SEAMLESS DATA TRANSFER BETWEEN STORAGE ENTITIES

(71) Applicant: Rubrik, Inc., Palo Alto, CA (US)

(72) Inventors: Udipta Das, Bengaluru (IN); Harshadrai Gajendrakumar Parekh, San Jose, CA (US)

(73) Assignee: Rubrik, Inc., Palo Alto, CA (US)

( * ) Notice: Subject to any disclaimer, the term of this patent is extended or adjusted under 35 U.S.C. 154(b) by 7 days.

(21) Appl. No.: 18/676,193

(22) Filed: May 28, 2024

(65) Prior Publication Data

US 2025/0370648 A1 Dec. 4, 2025

(51) Int. Cl.
*G06F 3/06* (2006.01)

(52) U.S. Cl.
CPC .......... *G06F 3/0647* (2013.01); *G06F 3/0604* (2013.01); *G06F 3/0673* (2013.01)

(58) Field of Classification Search
CPC ..... G06F 3/0647; G06F 3/0604; G06F 3/0673
See application file for complete search history.

(56) References Cited

U.S. PATENT DOCUMENTS

2018/0196832 A1* 7/2018 Maybee .................. G06F 3/065
2021/0240378 A1* 8/2021 Gurindapalli ....... G06F 11/1451
2022/0374532 A1* 11/2022 Zaharia ............... G06F 21/6218
2023/0069247 A1* 3/2023 Kucherov ............. G06F 16/955
2023/0134096 A1* 5/2023 Boyapalle .............. G06N 20/00 718/105
2024/0118815 A1* 4/2024 Muthuthodi Varikkottil ............... G06F 21/6218

* cited by examiner

*Primary Examiner* — Jared I Rutz
(74) *Attorney, Agent, or Firm* — Holland & Hart LLP

(57) ABSTRACT

Methods, systems, and devices for data management are described. A data management system (DMS) may receive a request to migrate data from a source data storage entity to a target data storage entity managed by the DMS. The DMS may verify that the data from the source data storage entity is compatible with one or more constraints associated with the target data storage entity and may identify one or more properties of the source data storage entity. The DMS may create the target data storage entity in accordance with the one or more constraints and properties of the source data storage entity. The DMS may provide a user with access to the target data storage entity, and a migration tool may be used to migrate the data to the target data storage entity. On completion, the DMS may commit the migration and activate the target storage entity.

20 Claims, 10 Drawing Sheets

SEAMLESS DATA TRANSFER BETWEEN STORAGE ENTITIES

FIELD OF TECHNOLOGY

The present disclosure relates generally to data management, including techniques for seamless data transfer between storage entities.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

A data management system (DMS) may backup data from a source computing system to a target computing system by periodically capturing snapshots of the data. As private and public cloud adoption has increased, so has the need for cloud-agnostic data management. Often, a DMS may provide for data storage subscriptions for users (e.g., to provide storage for the user's snapshots). Additionally, or alternatively, a user may maintain data in storage associated with their own account (having a separate subscription). The DMS may allow users to choose one of several cloud vendors, and solutions for migrating data from one cloud entity (account, subscription, device) to another. However, there may be a need for seamless migration of data from a first data storage entity (e.g., associated with a user managed data storage account) to a second data storage entity (e.g., may potentially be associated with a DMS managed data storage account).

One or more aspects of the present disclosure provide for a seamless migration, where a user is able to trigger an automated and secure solution to safely and confidently migrate their data across accounts, with reduced (e.g., no) manual configuration changes to the management system in use for upload, download, delete, and other management of data. In some examples, a DMS may receive a request from a user to initiate migration of data from a source data storage entity (e.g., user managed data storage account) to a target data storage entity (e.g., DMS managed data storage account). Upon receiving the request, the DMS may validate whether the source data set is compliant with one or more constraints at the target data storage entity. To minimize configuration changes, the DMS may identify a number of properties that are unchanged between the source data storage entity and the target data storage entity. The DMS, in some examples, may create a new storage account in accordance with the one or more constraints at the target data storage entity. Upon successful creation, the DMS may store an identifier of the newly created storage account in a migration table. Additionally, the DMS may provide users access to the created storage account, for a time period requested by the user upon creation of the storage account. In some examples, the user may initiate a data transfer (including data and metadata) from the source data storage entity to the new storage account in the target data storage entity. In some cases, the DMS may initiate a timer related to the access to the created storage account. For instance, the user may lose access to the created storage account upon expiration of the timer.

Figure 1:
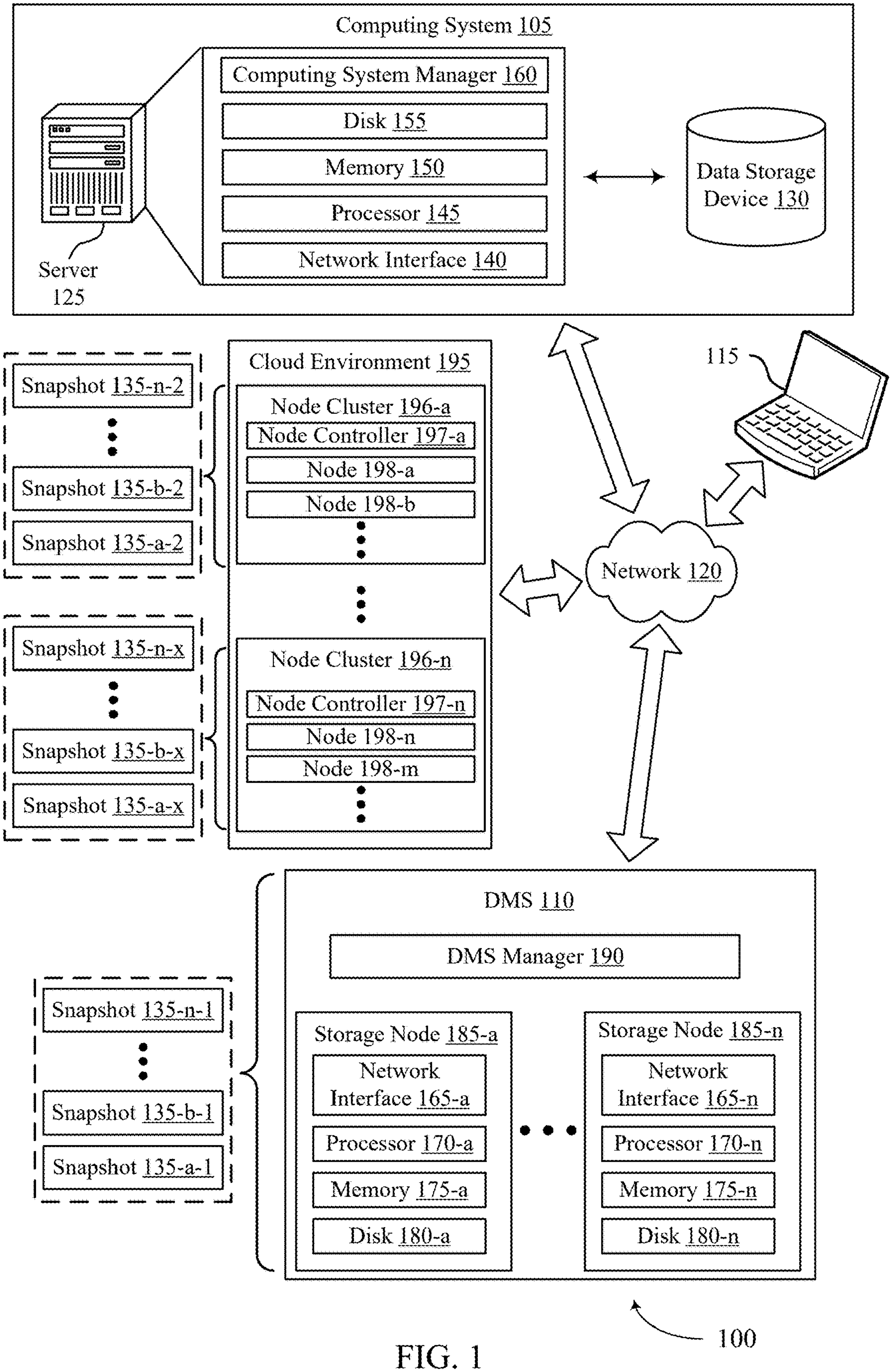
FIG. 1 illustrates an example of a computing environment that supports seamless data transfer between storage entities in accordance with aspects of the present disclosure.

FIG. 1 illustrates an example of a computing environment 100 that supports seamless data transfer between storage entities in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both.

Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructureas-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described herein.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. A base snapshot 135 may alternatively be referred to as a full snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a base snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a base snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft® Azure® or Amazon® Web Services®). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft® Azure®, and another node cluster 196 may be hosted on Amazon® Web Services®. In another example, multiple separate node clusters 196 for multiple different customers or tenants may be hosted on Microsoft® Azure®. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-*a* may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

In some examples, a computing system may support data migration from a source data storage entity to a target data storage entity. To create a target data storage entity, a customer may provide region and location name via a user interface. The computing system may add a new row to an archival location database table associated with the source data storage entity and generates a new random storage account identifier and a storage container name for the target data storage entity. The computing system may then add a new row in an archival location database table associated with the target data storage entity. The computing system may further generate assets (container inside account) created for the target data storage entity corresponding to a subscription associated with the user. Upon successful asset creation, the computing system may invoke a REST endpoint to update one or more database tables. The computing system may then wait for the asynchronous action (e.g., a data copy or transfer action performed by the user) to complete and may update a state of location once the asynchronous action is complete. In some cases, the computing system may implement a clean-up process if the asynchronous action fails. However, creation of new random storage account identifier and storage container name for the target data storage entity may create delays and may create unwanted errors. This may impact user experience.

To provide for seamless data migration, a DMS 110 may receive a request from a user to migrate a set of data from a source data storage entity to a target data storage entity managed by the DMS 110. In some examples, the DMS 110 may verify that the set of data from the source data storage entity is compatible with one or more constraints associated with the target data storage entity. The DMS 110 may further identify one or more properties of the source data storage entity and create the target data storage entity in accordance with the one or more constraints and the one or more properties of the source data storage entity. The DMS 110 may then provide the user with access to the target data storage entity.

Figure 2:
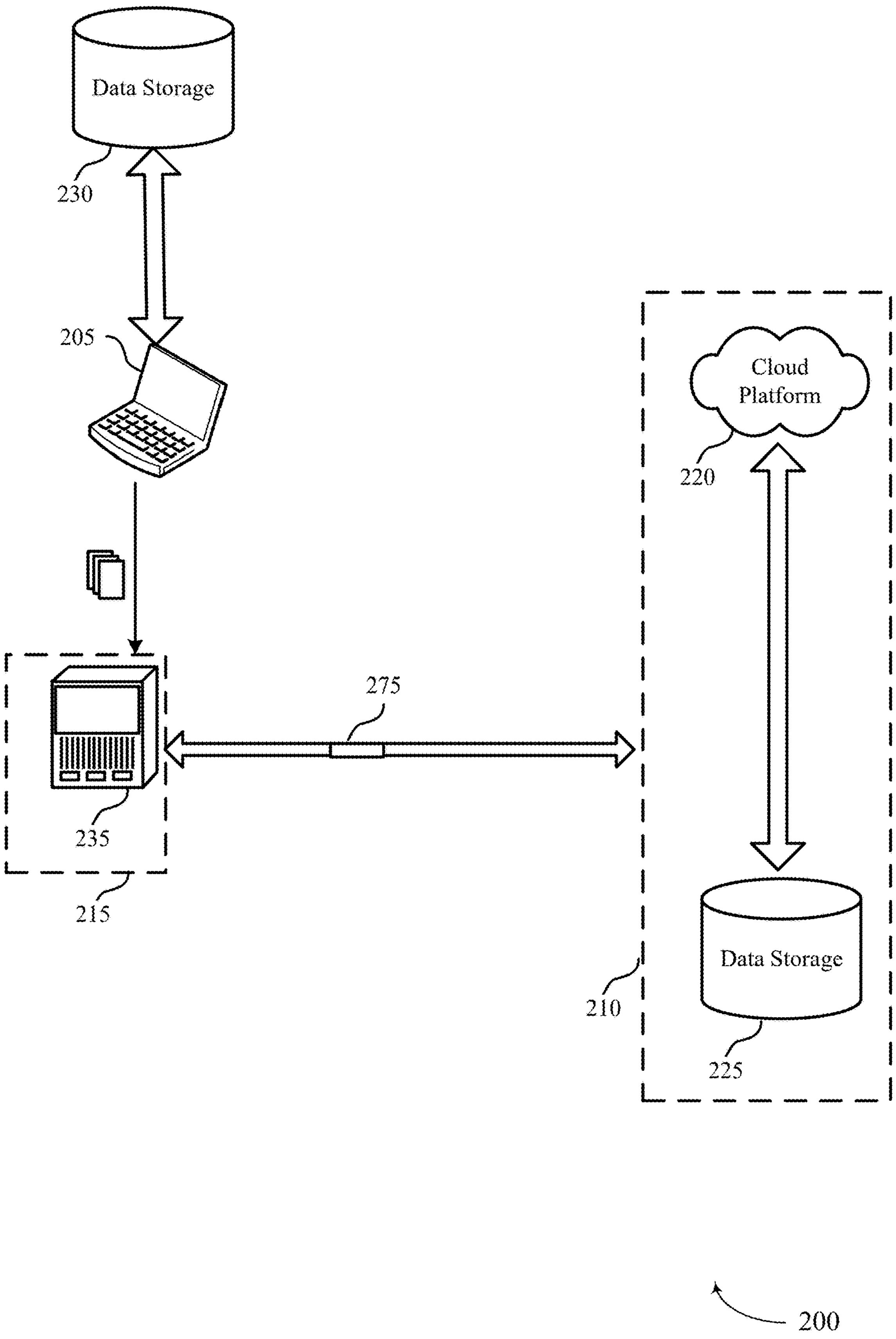
FIG. 2 shows an example of a computing system that supports seamless data transfer between storage entities in accordance with aspects of the present disclosure.

FIG. 2 shows an example of a computing system 200 that supports seamless data transfer between storage entities in accordance with aspects of the present disclosure. The computing system 200 includes a user device 205, a DMS 210 and a data manager 215. The DMS 210 may be or include a data storage infrastructure. Or, in some examples, the DMS 210 may manage but not itself include the data storage infrastructure—for example, the DMS 210 may manage a data store in a cloud environment. The user device 205 may be an example of a device described with reference to FIG. 1. The user device 205 may also be an example of a cloud client. The user device 205 may be in communication with a source data storage entity 230. A cloud client may access data sources using a network connection. The network may implement transfer control protocol and internet protocol (TCP/IP), such as the Internet, or may implement other network protocols. The user device 205 may be an example of a user device, such as a server, a smartphone, or a laptop. In other examples, a user device 205 may be a desktop computer, a tablet, a sensor, or another computing device or system capable of generating, analyzing, transmitting, or receiving communications. In some examples, the user device 205 may be operated by a user that is part of a business, an enterprise, a non-profit, a startup, or any other organization type.

The DMS 210 may include a data storage entity 225 (e.g., a storage node or a distributed storage node). Although not depicted herein, the DMS 210 may include more than one data storage entity 225. Multiple data storage entities 225 (e.g., storage nodes of a distributed storage architecture) may be geographically separated from each other. As depicted in the example of FIG. 2, the DMS 210 may include a cloud platform 220. The cloud platform 220 may offer an on-demand storage and computing services to the user device 205. In some cases, the DMS 210 may be an example of a storage system with built-in data management. The DMS 210 may serve multiple users with a single instance of software. However, other types of systems may be implemented, including—but not limited to—client-server systems, mobile device systems, and mobile network systems. The data manager 215 may be an example of an integrated data management and storage system. The data manager 215 may include an application server 235. The application server 235 may represent a unified storage system even though numerous storage nodes may be connected together and the number of connected storage nodes may change over time as storage nodes are added or removed. The data manager 215 may also be an example of a cloud-based storage and an on-demand computing platform.

In some examples, the computing system 200 may support an integrated data management and storage system and may be configured to manage the automated storage, backup, deduplication, replication, recovery, and archival of data within and across physical and virtual computing environments. The computing system 200 including an integrated data management and storage system may provide a unified primary and secondary storage system with built-in data management that may be used as both a backup storage system and a "live" primary storage system for primary workloads. In some cases, the integrated data management and storage system may manage dynamic versions when performing data storage. In some examples, the computing system 200 may provide backup of data (e.g., one or more files) using parallelized workloads, where the data may reside on virtual machines and/or real machines (e.g., a hardware server, a laptop, a tablet computer, a smartphone, or a mobile computing device).

The user device 205 may store data in the source data storage entity 230. As private and public cloud adoption has increased, so has the need for cloud agnostic management. A user (e.g., user using user device 205) may choose one of several cloud vendors, and solutions for migrating data from one cloud entity (account, subscription, device) to another. In some cases, a user may choose to migrate data from the source data storage entity 230 to a target data storage entity 225 (included in or otherwise managed by DMS 210. To provide for a seamless migration, the user may be able to trigger an automated, secure solution to safely and confidently migrate their data across accounts, with reduced to no manual configuration changes to the management system in use for upload, download, delete, and all other management of said data.

In accordance with one or more aspects depicted herein, the computing system 200 may provide for a seamless (e.g., fast, economical, and automated) migration with very few configuration updates on the DMS 210 (no manual updates). In some examples, the computing system 200 may use a cross cloud entity data movement tool to update internal metadata in the data as well as management planes in a synchronized fashion. The seamless data migration technique may be applicable to a secondary data management solution (SDM) (e.g., Data Centre Archival). In such cases, the SDM may be able to create, use, manage the lifecycle (create, access, delete, etc.) of data and their containers on disparate (private and/or public) cloud solutions. In some examples, an SDM may have subcomponents. For example, the SDM may include a data plane (SDM-DP) (e.g., cloud data management clusters) and a control plane (SDM-CP). The SDM may maintain a persistent state for mapping the data containers to vendor agnostic abstraction.

According to the techniques depicted herein, the DMS 210 in combination with the data manager 215 may enable customers (e.g., users) using their own data storage containers in their data storage accounts to migrate data from the data storage accounts in the source data storage entity 230 managed by the user to a target data storage entity 225 managed by the DMS 210 and the data manager 215. In some cases, the data manager 215 in combination with the DMS 210 may maintain data restrictions at the source data storage entity 230 while migrating data to the target data storage entity 225. Such seamless migration technique may provide for data migration without impacting service level agreement, configurations, or affecting accessibility of snapshots stored in the said data container.

For the techniques depicted herein, the computing system 200 may implement a persistent store for in progress migrations (e.g., a migration table). In particular, according to one or more aspects of the present disclosure, the data manager 215 may receive a request from a user (of user device 205) to migrate a set of data from a source data storage entity 230 to a target data storage entity 225 managed by the DMS 210. The data manager 215 may forward the request 275 to the DMS 210. In some examples, the DMS 210 in combination with the data manager 215 may validate that the source data set will be able to follow the destination constraints, and any operational/pricing constraints. For example, the DMS 210 may verify that the set of data from the source data storage entity 230 is compatible with one or more constraints associated with the target data storage entity 225. In order to minimize the configuration changes necessary in the SDM, the DMS 210 may determine the properties that the source and the new destination storage may be the same or related. In one example, the identifiers managed by the source data storage entity 230 and the identifiers managed by the target data storage entity 225 may be identical. In addition, the DMS 210 may determine that the name of the storage container (e.g., bucket) is identical across the source data storage entity 230 and the target data storage entity 225.

In some examples, the DMS 210 may identify one or more properties of the source data storage entity 230. The DMS 210 may create the target data storage entity 225 in accordance with the one or more constraints and the one or more properties of the source data storage entity 230. In some examples, the target data storage entity 225 may refer to a data storage account managed by the DMS 210. When creating the new storage asset, the DMS 210 in combination with the data manager 215 may obey the storage property constraints discussed herein. Upon success, the DMS 210 may store the identifiers of the created assets to a migration table. For instance, the DMS 210 may store one or more identifiers associated with the target data storage entity 225 in a migration database. In such cases, the migration database may include a set of rows storing information associated with a set of ongoing migration processes for migrating data to a set of target data storage entities managed by the DMS 210.

In some cases, the DMS 210 may provide a customer with access to the created asset, for a time period requested by the customer (limited by a maximum). For example, the DMS 210 may provide the user with access to the target data storage entity 225. In some example, the access may be or may include a shared access signature (SAS) tokenized uniform resource locator for the destination storage container. Upon receiving a request to migrate data from a user account managed by a user to a data platform managed by the DMS 210, the DMS 210 may create an account for the user. The DMS 210 may then provide the user with access to the created target data storage entity for a threshold time period. The DMS 210 may provide the user with the access upon receiving, from the user, a request to access the target data storage entity 225. In some examples, the DMS 210 may initiate a timer based on receiving the request for access to the target data storage entity for the threshold time period. In some cases, the timer may be set to terminate upon expiry of the threshold time period. In some examples, the tokenized uniform resource locator may expire upon expiry of the threshold time period. For instance, the DMS 210 may start a timer to clean up once the uniform resource locator expires. If the uniform resource locator expires, the DMS 210 may record the information associated with the created target data storage entity in the migration table (in a row of the migration table). In some cases, once the uniform resource locator has been utilized, the DMS 210 may delete the row from the migration table.

In some examples, the DMS 210 may refrain from updating the set of data in the source data storage entity 230 based on providing the user with access to the target data storage entity 225 (e.g., DMS 210 may stop updating new data, deletions, and metadata updates). In some examples, the DMS 210 may disable the location corresponding to the user account in the source data storage entity 230. In some examples, the DMS 210 may prompt user to migrate data and provide the user with the URL. In some cases, the user may invoke an existing data movement solution out of band, using the provided access method to the new storage. In some cases, the customer may invoke a copy tool to move data along with metadata (key value pairs) as well as properties (like Tier). Alternatively, the DMS 210 may determine that the tokenized uniform resource locator was not accessed prior to expiry of the threshold time period. In such cases, the DMS 210 may delete the target data storage entity 225 based on determining that the tokenized uniform resource locator was not accessed prior to expiry of the threshold time period.

The choice to seamlessly migrate data may be governed by the rules of data movement (rules associated with the source data storage entity 230 and the target data storage entity 225). The seamless migration technique depicted herein is economical, fast, secure, resilient, and efficient. Additionally, according to the techniques depicted herein, the data path may remain fully inside the cloud (e.g., SDM is not involved), for at least some operations (e.g., a cloning operation). Thus, the aspects of the present disclosure has no impact on the SDM configuration.

In some examples, after initiation of migration of data from the source data storage entity 230 to the target data storage entity 225, the computing system 200 may ensure that the data lands in the desired tier in the target data storage entity 225. In some examples, the DMS 210 may implement a statistical validation. For example, the DMS 210 may perform, after the set of data has been stored at the target data storage entity 225, a statistical validation of the set of data as stored at the target data storage entity 225. In some cases, the statistical validation may be used as the data movement tool is outside the control of the DMS 210 (e.g., outside SDM control). In some examples, a secondary storage may have very infrequent access. Errors may take a long time to be discovered. In some cases, although a full validation for the data volumes (100's of TB, PB) may not be viable, the computing system 200 may implement the statistical validation such that a separation between SDM-CP and SDM-DP is not impacted. In some examples, the SDM-DP may implement the validation and an asynchronous interface available from SDM-CP. In some cases, the SDM-DP may implement the statistical validation (the data manager 215 may trigger the statistical validation). In some examples, if the statistical validation fails, then the DMS 210 may cancel any active timer and may refrain from making any updates to the data. Additionally, or alternatively, the DMS 210 may request for support (e.g., manual support) upon determining that a statistical validation has failed.

In some examples, the DMS 210 may perform metadata updates (e.g., both SDM-DP and SDM-CP). For example, the DMS 210 may update one or more metadata tables associated with the set of data after a migration of the set of data to the target data storage entity 225. In some cases, the DMS 210 may receive an update to one or more metadata tables associated with the source data storage entity 230. The DMS 210 may then synchronize the metadata table updates by updating a metadata table associated with the target data storage entity 225. Such metadata updates may be retried at the DMS 210. In some examples, the DMS 210 may create a table entry for a new location at the target data storage entity 225 and update a generic archival table to use this new row rather than the one for the older container in the table associated with the source data storage entity 230. In some instances, the DMS 210 in combination with the data manager 215 may remove the older row (if the older row is still active) and then remove the corresponding row in the migration table.

In some examples, the DMS 210 may run an integrity check associated with the set of data after the set of data has been stored to the target data storage entity 225, where the integrity check is based on a comparison of properties between the target data storage entity 225 and metadata associated with the source data storage entity 230. In some examples, after running the integrity check (e.g., archival integrity check), the DMS 210 may cancel any active timers. In some cases, the integrity check may include validation by sampling based comparison of data in the source data storage entity 230 and target data storage entity 225. In some cases, the DMS 210 may compare the SDM metadata (e.g., file names, sizes as per SDM metadata) against metadata available at the target data storage entity 225. If the integrity check fails, then the DMS 210 may raise an alert (e.g., to manual support). After successful creation of the target data storage entity 225 (e.g., a data storage account included in a data store managed by the DMS 210, the DMS 210 may resume full functionality with new storage (e.g., DMS 210 may resume updates).

In some cases, the target data storage entity 230 may refer to or be associated with a database table. The updates described herein may happen if the user view is consistent, updates are atomic in sets and allows for roll forward or cleanup on failures.

As described herein, a user may use a data movement tool to migrate data from the source data storage entity 230 to the target data storage entity 225. In some examples, the computing system 200 may support validation of the data movement tool's work. For the SDM-DP, a first database table (e.g., first_data_location database table) may store the configuration of each storage in use. The first database table may further include, for each storage entity in use, information regarding data locations at which data is stored within that storage. The locations associated with the target data storage entity 225 may be managed by the DMS 210, but the first database table may include entries for them. For the SDM-CP, a second database table (e.g., second_data_location database table) may be synchronized from the first database table and a first archival location database table (e.g., first_archival_location database table) may map a generic identifier to a row in a type-specific table. In some examples, a second archival location table (e.g., source_archival_location database table) for the SDM-CP may store one or more location specific details associated with the source data storage entity (e.g., storage account name, access credentials, etc.). And in some cases, a third archival location table (e.g., target_archival_location database table) for the SDM-CP may store one or more location specific details associated with the target data storage entity (e.g., storage account name, access credentials, etc.).

According to the aspects depicted herein, in the case where the DMS 210 supports the in-band migration then the DMS 210 may not generate a tokenized uniform resource locator and provide the user with the access. In case the DMS 210 performs the migration of data (instead of using a data copying tool), then the DMS 210 may have the access permissions for the target data storage entity 225 and may need to be provided with the access permissions for the source data storage entity 230.

In some aspects, the computing system 200 may provide for data transfer that is agnostic to the archival tier at the target data storage entity 225. In some examples, the migrator tool may not be able to handle archive tiers (e.g., lower cost, higher latency storage tiers) associated with source data storage entity 230. In some cases, some of the source data (the SDM may be aware of the data) may be stored in accordance with an archive tier. This may be an offline tier. In order to read them, they may be rehydrated using a storage API. In some cases, the destination may have a separate restriction (all data may be in an available tier at the source data storage for the target data storage to seamlessly migrate the data). Thus, the source tier and the destination tier may differ. In some cases, the offline tier may use a different tool (e.g., az command). The tool may allow for initiation of rehydration of the offline tier data into an online tier in the destination location. The computing system 200 may then run the online tier data migrator (e.g., AzCopy tool). If this produces errors, then in some cases, the errors may be tallied to match the corresponding data stores (e.g., blobs) in the archive tier (or the offline Tier) in the source data storage entity.

In some cases, the DMS 210 may await the completion of the rehydration process by checking for the completion of the last initiated rehydration. In order to reduce the burden on the user (who runs the migrator), and the rehydrator, the DMS 210 may perform the check by directly querying for the presence of this last initiated file (e.g., Azure Blob) in the target data storage entity 225. Upon identifying the completion of the rehydration process, the DMS 210 may run the statistical validation. The DMS 210 may determine that the validator is rehydrated by adding some offset ranges of some data in the source for statistical validation. After the validation, the SDM-DP location metadata may be updated as depicted herein. Then, the DMS 210 may update the SDM's awareness of data in offline tier to reflect that the data has been migrated to the desired destination tier. This reconciliation from storage to SDM may use two tools—one to list snapshots that depend on a given list of files (or blobs) and one that, given a snapshot identifier, can reconcile a tier-aware state by reading the tier as per the storage. The DMS 210 may invoke these tools to first detect which snapshots depend on the files that are in an archive tier at the source and may then run reconciliation for only those snapshots.

Figure 3:
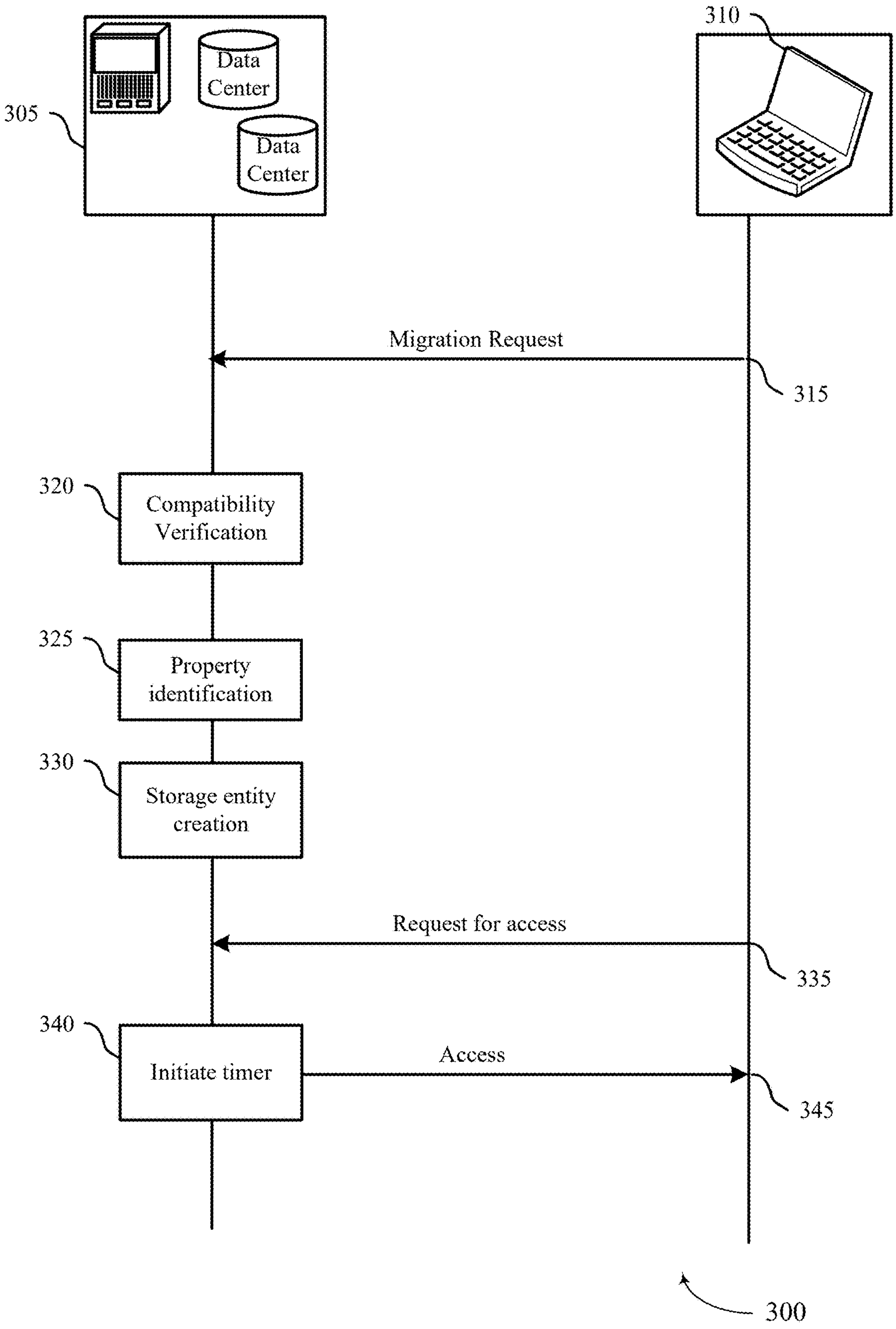
FIG. 3 shows an example of a process flow that supports seamless data transfer between storage entities in accordance with aspects of the present disclosure.

FIG. 3 shows an example of a process flow 300 that supports seamless data transfer between storage entities in accordance with aspects of the present disclosure. The process flow 300 includes a DMS 305 and a user device 310. The DMS 305 may include an application server, one or more data storages (e.g., multiple data centers of a computing cluster) as described with respect to FIGS. 1 and 2. The user device 310 may be an example of a user device as described with respect to FIGS. 1 and 2. Although a single entity is depicted as DMS 305, it may be understood that components of the DMS 305 may be located in different locations.

In some examples, the operations illustrated in the process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 315, the DMS 305 may receive a request from the user device 310 to migrate a set of data from a source data storage entity to a target data storage entity managed by the DMS.

At 320, the DMS 305 may verify that the set of data from the source data storage entity is compatible with one or more constraints associated with the target data storage entity. In some cases, the one or more constraints associated with the target data storage entity may include one or more operational constraints associated with the target data storage entity or one or more pricing constraints associated with the target data storage entity or both. At 325, the DMS 305 may identify one or more properties of the source data storage entity.

At 330, the DMS 305 may create the target data storage entity in accordance with the one or more constraints and the one or more properties of the source data storage entity. In some examples, the DMS 305 may store one or more identifiers associated with the target data storage entity in a migration database. In some cases, the migration database may include a set of rows storing information associated with a set of ongoing migration processes for migrating data to a set of target data storage entities managed by the DMS.

At 335, the DMS 305 may receive a request for access to the target data storage entity. At 340, the DMS 305 may initiating a timer based on receiving the request for access to the target data storage entity for a threshold time period.

At 345, the DMS 305 may provide the user with access to the target data storage entity for a threshold time period. In some cases, the DMS 305 may generate a tokenized uniform resource locator for accessing to the target data storage entity. In such cases, providing the user with access to the target data storage entity may include outputting the tokenized uniform resource locator to the user, where the tokenized uniform resource locator expires upon expiry of the threshold time period.

Figure 4:
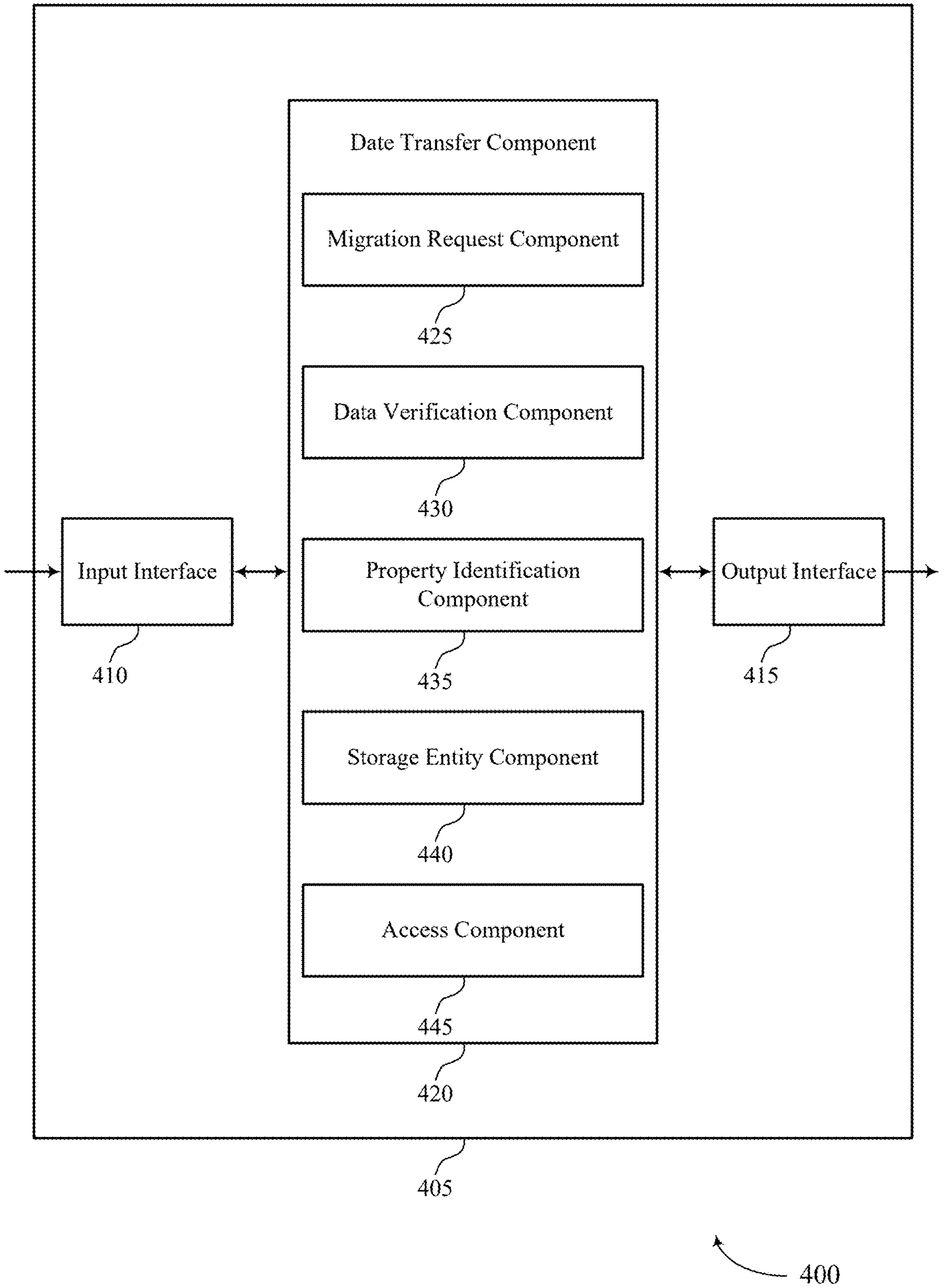
FIG. 4 shows a block diagram of an apparatus that supports seamless data transfer between storage entities in accordance with aspects of the present disclosure.

FIG. 4 shows a block diagram 400 of a system 405 that supports seamless data transfer between storage entities in accordance with aspects of the present disclosure. In some examples, the system 405 may be an example of aspects of one or more components described with reference to FIG. 1, such as a DMS 110. The system 405 may include an input interface 410, an output interface 415, and a data transfer component 420. The system 405 may also include one or more processors. Each of these components may be in communication with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the data transfer component 420 to support seamless data transfer between storage entities. In some cases, the input interface 410 may be a component of a network interface 625 as described with reference to FIG. 6.

The output interface 415 may manage output signaling for the system 405. For example, the output interface 415 may receive signaling from other components of the system 405, such as the data transfer component 420, and may transmit such output signaling corresponding to (e.g., representative of or otherwise based on) such signaling to other systems or devices. In some cases, the output interface 415 may be a component of a network interface 625 as described with reference to FIG. 6.

For example, the data transfer component 420 may include a migration request component 425, a data verification component 430, a property identification component 435, a storage entity component 440, an access component 445, or any combination thereof. In some examples, the data transfer component 420, or various components thereof, may be configured to perform various operations (e.g., receiving, monitoring, transmitting) using or otherwise in cooperation with the input interface 410, the output interface 415, or both. For example, the data transfer component 420 may receive information from the input interface 410, send information to the output interface 415, or be integrated in combination with the input interface 410, the output interface 415, or both to receive information, transmit information, or perform various other operations as described herein.

The migration request component 425 may be configured as or otherwise support a means for receiving, by a DMS, a request from a user to migrate a set of data from a source data storage entity to a target data storage entity managed by the DMS. The data verification component 430 may be configured as or otherwise support a means for verifying, by the DMS, that the set of data from the source data storage entity is compatible with one or more constraints associated with the target data storage entity. The property identification component 435 may be configured as or otherwise support a means for identifying, by the DMS, one or more properties of the source data storage entity. The storage entity component 440 may be configured as or otherwise support a means for creating, by the DMS, the target data storage entity in accordance with the one or more constraints and the one or more properties of the source data storage entity. The access component 445 may be configured as or otherwise support a means for providing, by the DMS, the user with access to the target data storage entity.

Figure 5:
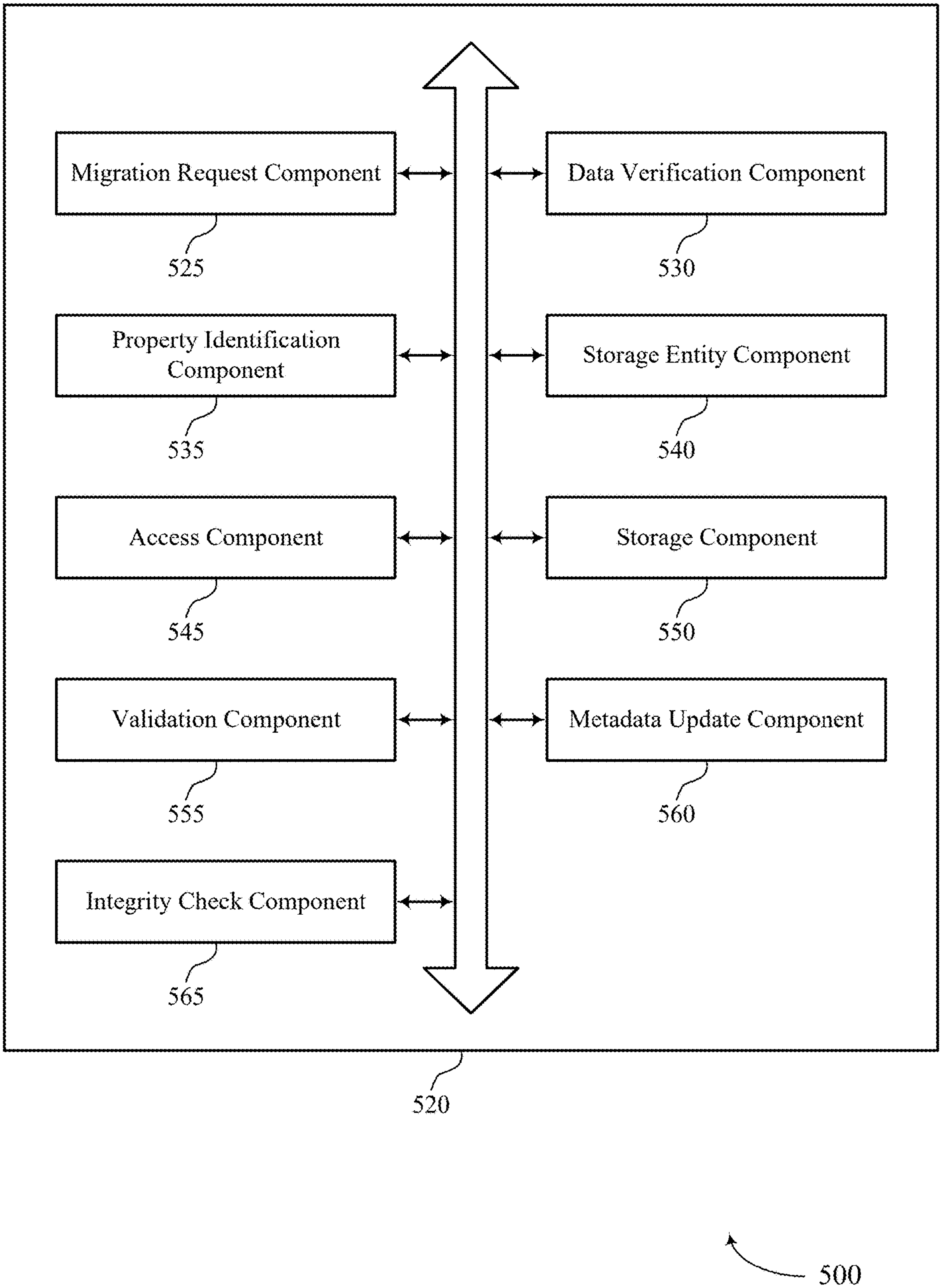
FIG. 5 shows a block diagram of a data transfer component that supports seamless data transfer between storage entities in accordance with aspects of the present disclosure.

FIG. 5 shows a block diagram 500 of a data transfer component 520 that supports seamless data transfer between storage entities in accordance with aspects of the present disclosure. The data transfer component 520 may be an example of aspects of a data transfer component 420, as described herein. The data transfer component 520, or various components thereof, may be an example of means for performing various aspects of seamless data transfer between storage entities as described herein. For example, the data transfer component 520 may include a migration request component 525, a data verification component 530, a property identification component 535, a storage entity component 540, an access component 545, a storage component 550, a validation component 555, a metadata update component 560, an integrity check component 565, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The migration request component 525 may be configured as or otherwise support a means for receiving, by a DMS, a request from a user to migrate a set of data from a source data storage entity to a target data storage entity managed by the DMS. The data verification component 530 may be configured as or otherwise support a means for verifying, by the DMS, that the set of data from the source data storage entity is compatible with one or more constraints associated with the target data storage entity. The property identification component 535 may be configured as or otherwise support a means for identifying, by the data management system, one or more properties of the source data storage entity. The storage entity component 540 may be configured as or otherwise support a means for creating, by the DMS, the target data storage entity in accordance with the one or more constraints and the one or more properties of the source data storage entity. The access component 545 may be configured as or otherwise support a means for providing, by the DMS, the user with access to the target data storage entity.

In some examples, the storage component 550 may be configured as or otherwise support a means for storing one or more identifiers associated with the target data storage entity in a migration database, where the migration database includes a set of multiple rows storing information associated with a set of multiple ongoing migration processes for migrating data to a set of multiple target data storage entities managed by the DMS.

In some examples, to support providing the user with access to the target data storage entity, the access component 545 may be configured as or otherwise support a means for providing the user with access to the target data storage entity for a threshold time period.

In some examples, the access component 545 may be configured as or otherwise support a means for receiving, from the user of the DMS, a request for access to the target data storage entity, where providing the user with access to the target data storage entity is in response to the request for access.

In some examples, the access component 545 may be configured as or otherwise support a means for initiating a timer based on receiving the request for access to the target data storage entity for the threshold time period, where the timer is set to terminate upon expiry of the threshold time period.

In some examples, the access component 545 may be configured as or otherwise support a means for generating a tokenized uniform resource locator for accessing to the target data storage entity, where providing the user with access to the target data storage entity includes outputting the tokenized uniform resource locator to the user, and where the tokenized uniform resource locator expires upon expiry of the threshold time period.

In some examples, the access component 545 may be configured as or otherwise support a means for determining that the tokenized uniform resource locator was not accessed prior to expiry of the threshold time period. In some examples, the storage entity component 540 may be configured as or otherwise support a means for deleting the target data storage entity based on determining that the tokenized uniform resource locator was not accessed prior to expiry of the threshold time period.

In some examples, the storage entity component 540 may be configured as or otherwise support a means for refraining from updating the set of data in the source data storage entity based on providing the user with access to the target data storage entity.

In some examples, the migration request component 525 may be configured as or otherwise support a means for receiving a request to migrate the set of data from the source data storage entity to the target data storage entity after providing the user with access to the target data storage entity. In some examples, the migration request component 525 may be configured as or otherwise support a means for transferring the set of data from the source data storage entity to the target data storage entity in response to the request to migrate.

In some examples, the validation component 555 may be configured as or otherwise support a means for performing, after the set of data has been stored to the target data storage entity, a statistical validation of the set of data as stored at the target data storage entity. In some examples, the metadata update component 560 may be configured as or otherwise support a means for updating one or more metadata tables associated with the set of data after a migration of the set of data to the target data storage entity.

In some examples, the integrity check component 565 may be configured as or otherwise support a means for performing an integrity check associated with the set of data after the set of data has been stored to the target data storage entity. In some cases, the integrity check may be based on a comparison of at least a portion of the set of data as stored at the target data storage entity to at least a portion of the set of data as stored at the source data storage entity. In some examples, the one or more constraints associated with the target data storage entity includes one or more operational constraints associated with the target data storage entity or one or more pricing constraints associated with the target data storage entity or both.

Figure 6:
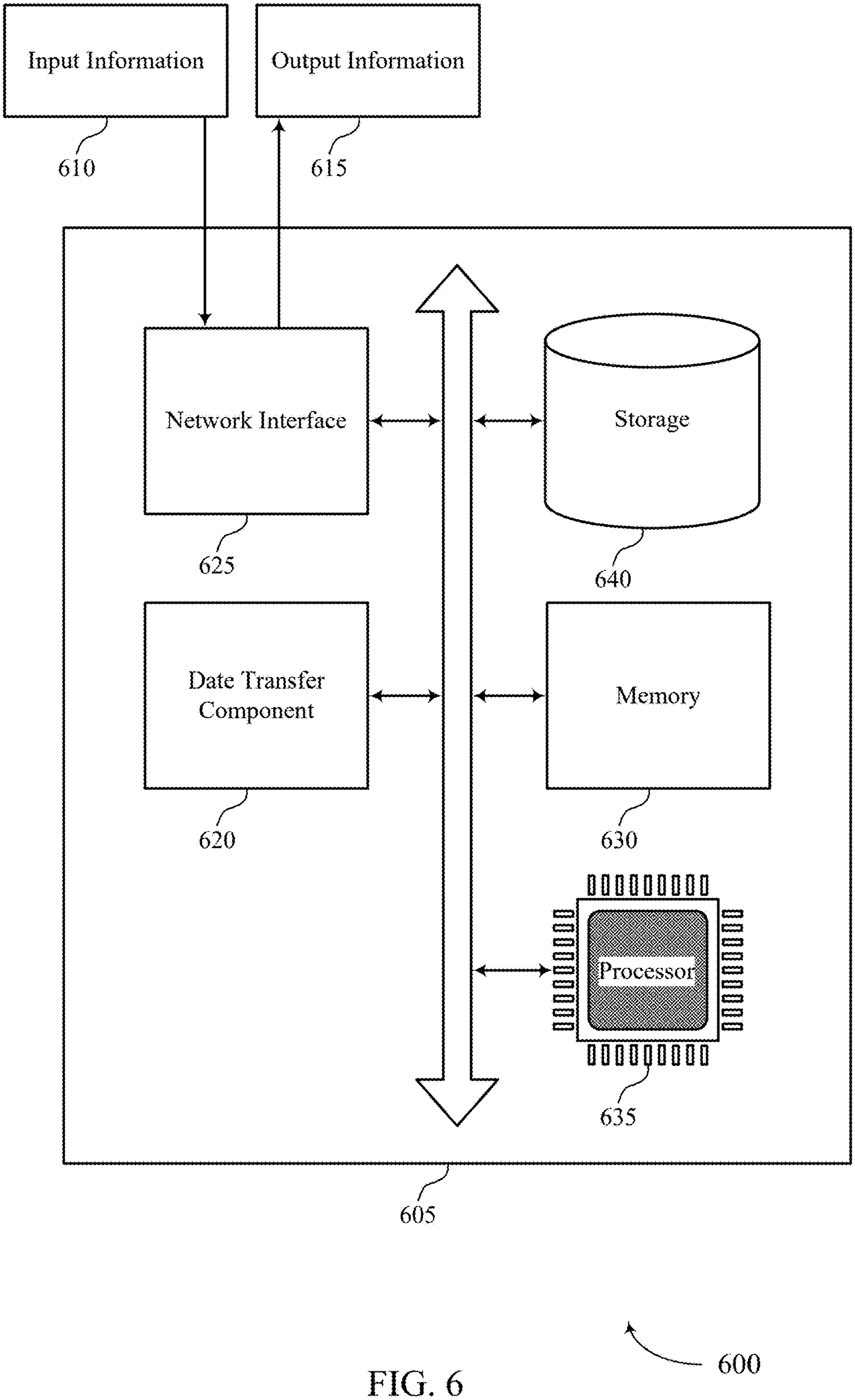
FIG. 6 shows a diagram of a system including a device that supports seamless data transfer between storage entities in accordance with aspects of the present disclosure.

FIG. 6 shows a block diagram 600 of a system 605 that supports seamless data transfer between storage entities in accordance with aspects of the present disclosure. The system 605 may be an example of or include components of a system 405 as described herein. The system 605 may include components for data management, including components such as a data transfer component 620, an input information 610, an output information 615, a network interface 625, at least one memory 630, at least one processor 635, and a storage 640. These components may be in electronic communication or otherwise coupled with each other (e.g., operatively, communicatively, functionally, electronically, electrically; via one or more buses, communications links, communications interfaces, or any combination thereof). Additionally, the components of the system 605 may include corresponding physical components or may be implemented as corresponding virtual components (e.g., components of one or more virtual machines). In some examples, the system 605 may be an example of aspects of one or more components described with reference to FIG. 1, such as a DMS 110.

The network interface 625 may enable the system 605 to exchange information (e.g., input information 610, output information 615, or both) with other systems or devices (not shown). For example, the network interface 625 may enable the system 605 to connect to a network (e.g., a network 120 as described herein). The network interface 625 may include one or more wireless network interfaces, one or more wired network interfaces, or any combination thereof. In some examples, the network interface 625 may be an example of may be an example of aspects of one or more components described with reference to FIG. 1, such as one or more network interfaces 165.

Memory 630 may include RAM, ROM, or both. The memory 630 may store computer-readable, computer-executable software including instructions that, when executed, cause the processor 635 to perform various functions described herein. In some cases, the memory 630 may contain, among other things, a basic input/output system (BIOS), which may control basic hardware or software operation such as the interaction with peripheral components or devices. In some cases, the memory 630 may be an example of aspects of one or more components described with reference to FIG. 1, such as one or more memories 175.

The processor 635 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 635 may be configured to execute computer-readable instructions stored in a memory 630 to perform various functions (e.g., functions or tasks supporting seamless data transfer between storage entities). Though a single processor 635 is depicted in the example of FIG. 6, it is to be understood that the system 605 may include any quantity of one or more of processors 635 and that a group of processors 635 may collectively perform one or more functions ascribed herein to a processor, such as the processor 635. In some cases, the processor 635 may be an example of aspects of one or more components described with reference to FIG. 1, such as one or more processors 170.

Storage 640 may be configured to store data that is generated, processed, stored, or otherwise used by the system 605. In some cases, the storage 640 may include one or more HDDs, one or more SDDs, or both. In some examples, the storage 640 may be an example of a single database, a distributed database, multiple distributed databases, a data store, a data lake, or an emergency backup database. In some examples, the storage 640 may be an example of one or more components described with reference to FIG. 1, such as one or more network disks 180.

For example, the data transfer component 620 may be configured as or otherwise support a means for receiving, by a DMS, a request from a user to migrate a set of data from a source data storage entity to a target data storage entity managed by the DMS. The data transfer component 620 may be configured as or otherwise support a means for verifying, by the DMS, that the set of data from the source data storage entity being compatible with one or more constraints associated with the target data storage entity. The data transfer component 620 may be configured as or otherwise support a means for identifying, by the DMS, one or more properties of the source data storage entity. The data transfer component 620 may be configured as or otherwise support a means for creating, by the DMS, the target data storage entity in accordance with the one or more constraints and the one or more properties of the source data storage entity. The data transfer component 620 may be configured as or otherwise support a means for providing, by the DMS, the user with access to the target data storage entity.

By including or configuring the data transfer component 620 in accordance with examples as described herein, the system 605 may support techniques for seamless data transfer between storage entities, which may provide one or more benefits such as, for example, improved reliability, reduced latency, improved user experience, and more efficient utilization of computing resources, network resources or both, among other possibilities.

Figure 7:
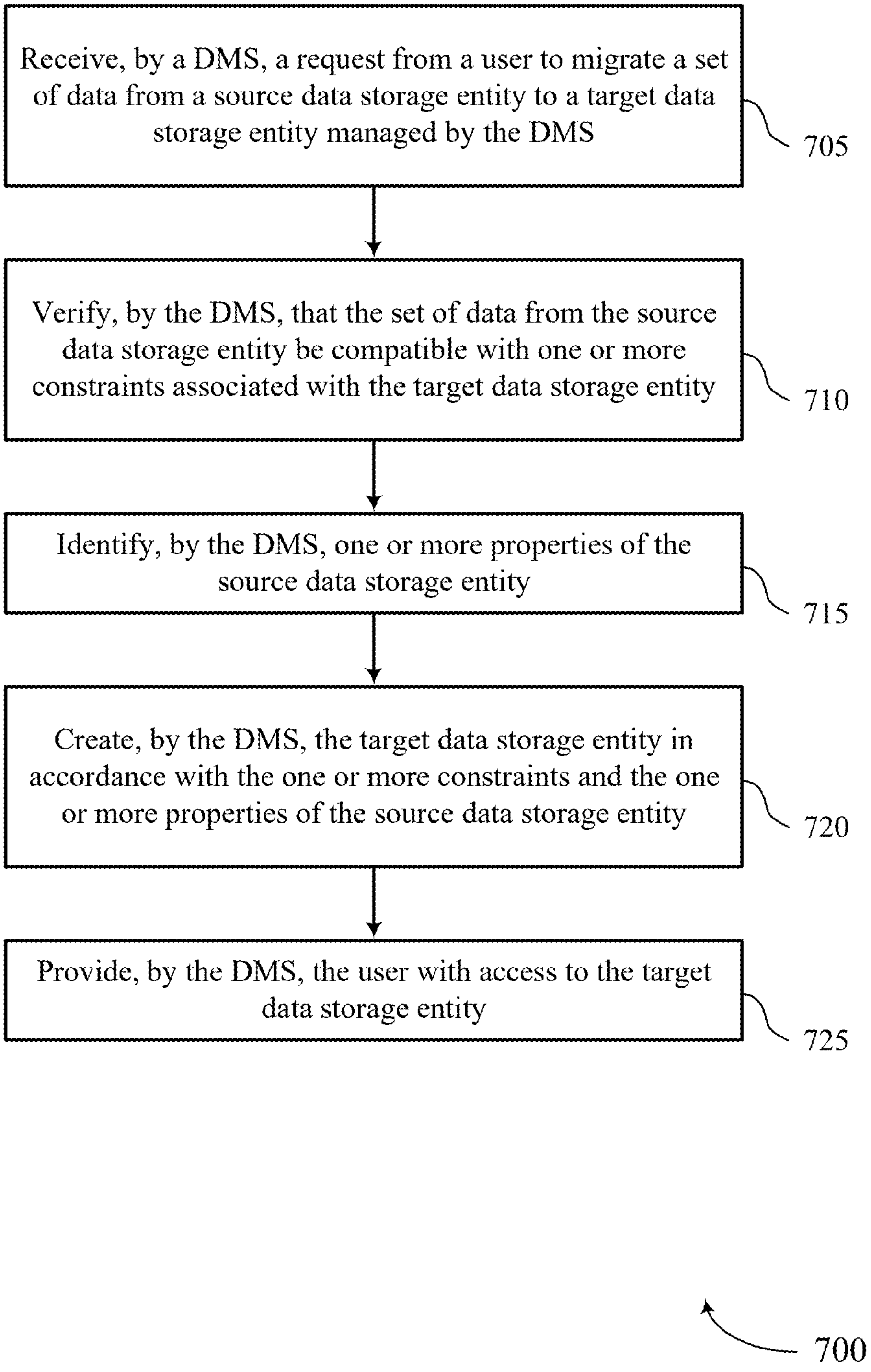
FIGS. 7 through 10 show flowcharts illustrating methods that support seamless data transfer between storage entities in accordance with aspects of the present disclosure.

FIG. 7 shows a flowchart illustrating a method 700 that supports seamless data transfer between storage entities in accordance with aspects of the present disclosure. The operations of the method 700 may be implemented by a DMS or its components as described herein. For example, the operations of the method 700 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 705, the method may include receiving, by a DMS, a request from a user to migrate a set of data from a source data storage entity to a target data storage entity managed by the DMS. The operations of 705 may be performed in accordance with examples as disclosed herein. In some examples, aspects of the operations of 705 may be performed by a migration request component 525 as described with reference to FIG. 5.

At 710, the method may include verifying, by the DMS, that the set of data from the source data storage entity is compatible with one or more constraints associated with the target data storage entity. The operations of 710 may be performed in accordance with examples as disclosed herein. In some examples, aspects of the operations of 710 may be performed by a data verification component 530 as described with reference to FIG. 5.

At 715, the method may include identifying, by the DMS, one or more properties of the source data storage entity. The operations of 715 may be performed in accordance with examples as disclosed herein. In some examples, aspects of the operations of 715 may be performed by a property identification component 535 as described with reference to FIG. 5.

At 720, the method may include creating, by the DMS, the target data storage entity in accordance with the one or more constraints and the one or more properties of the source data storage entity. The operations of 720 may be performed in accordance with examples as disclosed herein. In some examples, aspects of the operations of 720 may be performed by a storage entity component 540 as described with reference to FIG. 5.

At 725, the method may include providing, by the DMS, the user with access to the target data storage entity. The operations of 725 may be performed in accordance with examples as disclosed herein. In some examples, aspects of the operations of 725 may be performed by an access component 545 as described with reference to FIG. 5.

Figure 8:
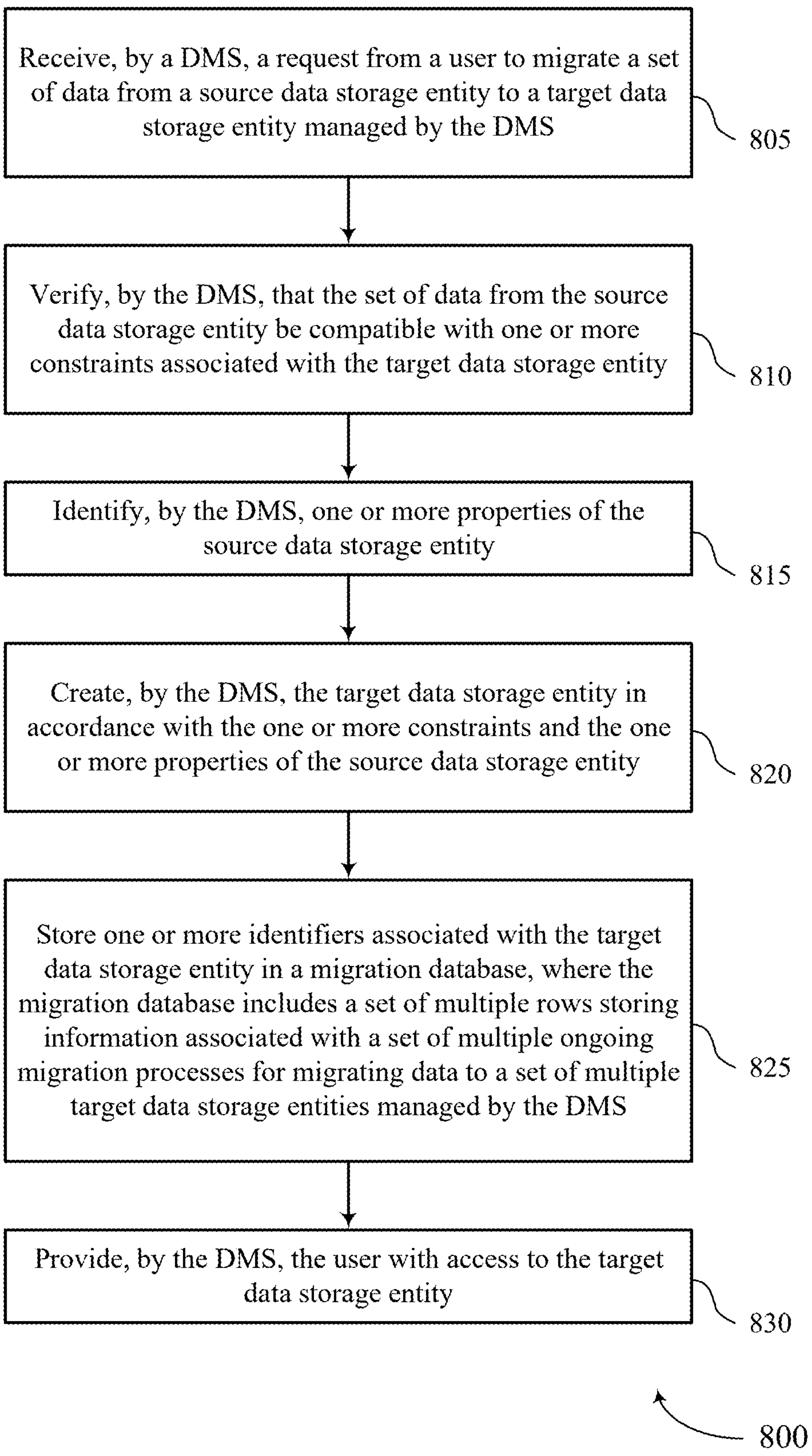

FIG. 8 shows a flowchart illustrating a method 800 that supports seamless data transfer between storage entities in accordance with aspects of the present disclosure. The operations of the method 800 may be implemented by a DMS or its components as described herein. For example, the operations of the method 800 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 805, the method may include receiving, by a DMS, a request from a user to migrate a set of data from a source data storage entity to a target data storage entity managed by the DMS. The operations of 805 may be performed in accordance with examples as disclosed herein. In some examples, aspects of the operations of 805 may be performed by a migration request component 525 as described with reference to FIG. 5.

At 810, the method may include verifying, by the DMS, that the set of data from the source data storage entity is compatible with one or more constraints associated with the target data storage entity. The operations of 810 may be performed in accordance with examples as disclosed herein. In some examples, aspects of the operations of 810 may be performed by a data verification component 530 as described with reference to FIG. 5.

At 815, the method may include identifying, by the DMS, one or more properties of the source data storage entity. The operations of 815 may be performed in accordance with examples as disclosed herein. In some examples, aspects of the operations of 815 may be performed by a property identification component 535 as described with reference to FIG. 5.

At 820, the method may include creating, by the DMS, the target data storage entity in accordance with the one or more constraints and the one or more properties of the source data storage entity. The operations of 820 may be performed in accordance with examples as disclosed herein. In some examples, aspects of the operations of 820 may be performed by a storage entity component 540 as described with reference to FIG. 5.

At 825, the method may include storing one or more identifiers associated with the target data storage entity in a migration database, where the migration database includes a set of multiple rows storing information associated with a set of multiple ongoing migration processes for migrating data to a set of multiple target data storage entities managed by the DMS. The operations of 825 may be performed in accordance with examples as disclosed herein. In some examples, aspects of the operations of 825 may be performed by a storage component 550 as described with reference to FIG. 5.

At 830, the method may include providing, by the DMS, the user with access to the target data storage entity. The operations of 830 may be performed in accordance with examples as disclosed herein. In some examples, aspects of the operations of 830 may be performed by an access component 545 as described with reference to FIG. 5.

Figure 9:
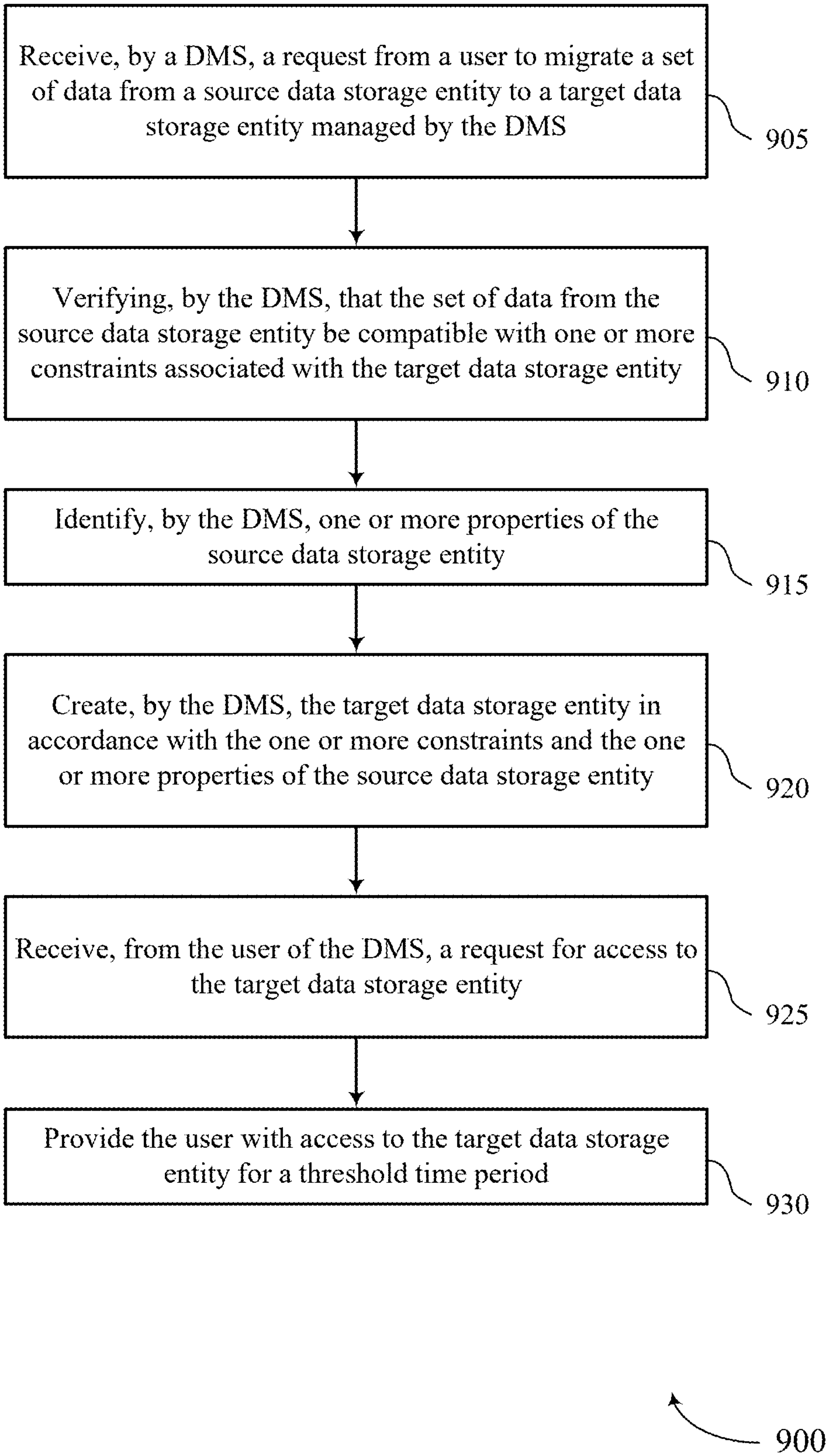

FIG. 9 shows a flowchart illustrating a method 900 that supports seamless data transfer between storage entities in accordance with aspects of the present disclosure. The operations of the method 900 may be implemented by a DMS or its components as described herein. For example, the operations of the method 900 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 905, the method may include receiving, by a DMS, a request from a user to migrate a set of data from a source data storage entity to a target data storage entity managed by the DMS. The operations of 905 may be performed in accordance with examples as disclosed herein. In some examples, aspects of the operations of 905 may be performed by a migration request component 525 as described with reference to FIG. 5.

At 910, the method may include verifying, by the DMS, that the set of data from the source data storage entity is compatible with one or more constraints associated with the target data storage entity. The operations of 910 may be performed in accordance with examples as disclosed herein. In some examples, aspects of the operations of 910 may be performed by a data verification component 530 as described with reference to FIG. 5.

At 915, the method may include identifying, by the DMS, one or more properties of the source data storage entity. The operations of 915 may be performed in accordance with examples as disclosed herein. In some examples, aspects of the operations of 915 may be performed by a property identification component 535 as described with reference to FIG. 5.

At 920, the method may include creating, by the DMS, the target data storage entity in accordance with the one or more constraints and the one or more properties of the source data storage entity. The operations of 920 may be performed in accordance with examples as disclosed herein. In some examples, aspects of the operations of 920 may be performed by a storage entity component 540 as described with reference to FIG. 5.

At 925, the method may include receiving, from the user of the DMS, a request for access to the target data storage entity. The operations of 925 may be performed in accordance with examples as disclosed herein. In some examples, aspects of the operations of 925 may be performed by an access component 545 as described with reference to FIG. 5.

At 930, the method may include providing the user with access to the target data storage entity for a threshold time period. In some cases, where providing the user with access to the target data storage entity is in response to the request for access. The operations of 930 may be performed in accordance with examples as disclosed herein. In some examples, aspects of the operations of 930 may be performed by an access component 545 as described with reference to FIG. 5.

Figure 10:
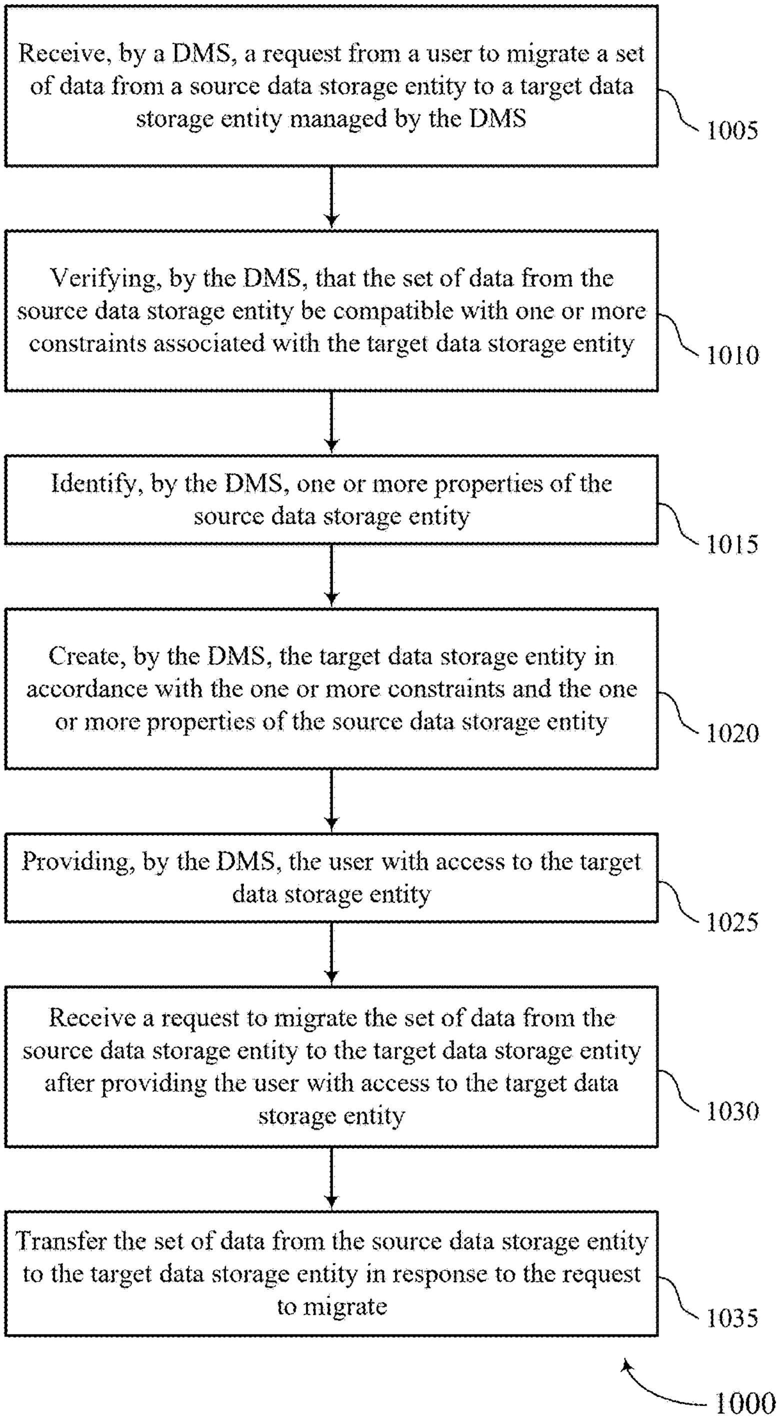

FIG. 10 shows a flowchart illustrating a method 1000 that supports seamless data transfer between storage entities in accordance with aspects of the present disclosure. The operations of the method 1000 may be implemented by a DMS or its components as described herein. For example, the operations of the method 1000 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 1005, the method may include receiving, by a DMS, a request from a user to migrate a set of data from a source data storage entity to a target data storage entity managed by the DMS. The operations of 1005 may be performed in accordance with examples as disclosed herein. In some examples, aspects of the operations of 1005 may be performed by a migration request component 525 as described with reference to FIG. 5.

At 1010, the method may include verifying, by the DMS, that the set of data from the source data storage entity is compatible with one or more constraints associated with the target data storage entity. The operations of 1010 may be performed in accordance with examples as disclosed herein. In some examples, aspects of the operations of 1010 may be performed by a data verification component 530 as described with reference to FIG. 5.

At 1015, the method may include identifying, by the DMS, one or more properties of the source data storage entity. The operations of 1015 may be performed in accordance with examples as disclosed herein. In some examples, aspects of the operations of 1015 may be performed by a property identification component 535 as described with reference to FIG. 5.

At 1020, the method may include creating, by the DMS, the target data storage entity in accordance with the one or more constraints and the one or more properties of the source data storage entity. The operations of 1020 may be performed in accordance with examples as disclosed herein. In some examples, aspects of the operations of 1020 may be performed by a storage entity component 540 as described with reference to FIG. 5.

At 1025, the method may include providing, by the DMS, the user with access to the target data storage entity. The operations of 1025 may be performed in accordance with examples as disclosed herein. In some examples, aspects of the operations of 1025 may be performed by an access component 545 as described with reference to FIG. 5.

At 1030, the method may include receiving a request to migrate the set of data from the source data storage entity to the target data storage entity after providing the user with access to the target data storage entity. The operations of 1030 may be performed in accordance with examples as disclosed herein. In some examples, aspects of the operations of 1030 may be performed by a migration request component 525 as described with reference to FIG. 5.

At 1035, the method may include transferring the set of data from the source data storage entity to the target data storage entity in response to the request to migrate. The operations of 1035 may be performed in accordance with examples as disclosed herein. In some examples, aspects of the operations of 1035 may be performed by a migration request component 525 as described with reference to FIG. 5.

A method by an apparatus is described. The method may include receiving, by a data management system, a request from a user to migrate a set of data from a source data storage entity to a target data storage entity managed by the data management system, verifying, by the data management system, that the set of data from the source data storage entity is compatible with one or more constraints associated with the target data storage entity, identifying, by the data management system, one or more properties of the source data storage entity, creating, by the data management system, the target data storage entity in accordance with the one or more constraints and the one or more properties of the source data storage entity, and providing, by the data management system, the user with access to the target data storage entity.

An apparatus is described. The apparatus may include one or more memories storing processor executable code, and one or more processors coupled with the one or more memories. The one or more processors may individually or collectively be operable to execute the code to cause the apparatus to receive, by a data management system, a request from a user to migrate a set of data from a source data storage entity to a target data storage entity managed by the data management system, verifying, by the data management system, that the set of data from the source data storage entity be compatible with one or more constraints associated with the target data storage entity, identify, by the data management system, one or more properties of the source data storage entity, create, by the data management system, the target data storage entity in accordance with the one or more constraints and the one or more properties of the source data storage entity, and providing, by the data management system, the user with access to the target data storage entity.

Another apparatus is described. The apparatus may include means for receiving, by a data management system, a request from a user to migrate a set of data from a source data storage entity to a target data storage entity managed by the data management system, means for verifying, by the data management system, that the set of data from the source data storage entity is compatible with one or more constraints associated with the target data storage entity, means for identifying, by the data management system, one or more properties of the source data storage entity, means for creating, by the data management system, the target data storage entity in accordance with the one or more constraints and the one or more properties of the source data storage entity, and means for providing, by the data management system, the user with access to the target data storage entity.

A non-transitory computer-readable medium storing code is described. The code may include instructions executable by one or more processors to receive, by a data management system, a request from a user to migrate a set of data from a source data storage entity to a target data storage entity managed by the data management system, verifying, by the data management system, that the set of data from the source data storage entity be compatible with one or more constraints associated with the target data storage entity, identify, by the data management system, one or more properties of the source data storage entity, create, by the data management system, the target data storage entity in accordance with the one or more constraints and the one or more properties of the source data storage entity, and providing, by the data management system, the user with access to the target data storage entity.

Some examples of the method, apparatus, and non-transitory computer-readable medium described herein may further include operations, features, means, or instructions for storing one or more identifiers associated with the target data storage entity in a migration database, where the migration database includes a set of multiple rows storing information associated with a set of multiple ongoing migration processes for migrating data to a set of multiple target data storage entities managed by the data management system.

In some examples of the method, apparatus, and non-transitory computer-readable medium described herein, providing the user with access to the target data storage entity may include operations, features, means, or instructions for providing the user with access to the target data storage entity for a threshold time period.

Some examples of the method, apparatus, and non-transitory computer-readable medium described herein may further include operations, features, means, or instructions for receiving, from the user of the data management system, a request for access to the target data storage entity, where providing the user with access to the target data storage entity may be in response to the request for access.

Some examples of the method, apparatus, and non-transitory computer-readable medium described herein may further include operations, features, means, or instructions for initiating a timer based on receiving the request for access to the target data storage entity for the threshold time period, where the timer may be set to terminate upon expiry of the threshold time period.

Some examples of the method, apparatus, and non-transitory computer-readable medium described herein may further include operations, features, means, or instructions for generating a tokenized uniform resource locator for accessing to the target data storage entity, where providing the user with access to the target data storage entity includes outputting the tokenized uniform resource locator to the user, and where the tokenized uniform resource locator expires upon expiry of the threshold time period.

Some examples of the method, apparatus, and non-transitory computer-readable medium described herein may further include operations, features, means, or instructions for determining that the tokenized uniform resource locator was not accessed prior to expiry of the threshold time period and deleting the target data storage entity based on determining that the tokenized uniform resource locator was not accessed prior to expiry of the threshold time period.

Some examples of the method, apparatus, and non-transitory computer-readable medium described herein may further include operations, features, means, or instructions for refraining from updating the set of data in the source data storage entity based on providing the user with access to the target data storage entity.

Some examples of the method, apparatus, and non-transitory computer-readable medium described herein may further include operations, features, means, or instructions for receiving a request to migrate the set of data from the source data storage entity to the target data storage entity after providing the user with access to the target data storage entity and transferring the set of data from the source data storage entity to the target data storage entity in response to the request to migrate.

Some examples of the method, apparatus, and non-transitory computer-readable medium described herein may further include operations, features, means, or instructions for performing, after the set of data has been stored to the target data storage entity, a statistical validation of the set of data as stored at the target data storage entity.

Some examples of the method, apparatus, and non-transitory computer-readable medium described herein may further include operations, features, means, or instructions for updating one or more metadata tables associated with the set of data after a migration of the set of data to the target data storage entity.

Some examples of the method, apparatus, and non-transitory computer-readable medium described herein may further include operations, features, means, or instructions for performing an integrity check associated with the set of data after the set of data has been stored to the target data storage entity. In some cases, the integrity check is based on a comparison of at least a portion of the set of data as stored at the target data storage entity to at least a portion of the set of data as stored at the source data storage entity.

In some examples of the method, apparatus, and non-transitory computer-readable medium described herein, the one or more constraints associated with the target data storage entity includes one or more operational constraints associated with the target data storage entity or one or more pricing constraints associated with the target data storage entity or both.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method comprising:

receiving, by a data management system, a request from a user to migrate a set of data from a source data storage entity managed by the user to a target data storage entity in a datastore managed by the data management system;

verifying, by the data management system, that the set of data from the source data storage entity is compatible with one or more constraints associated with the target data storage entity;

identifying, by the data management system, one or more properties of the source data storage entity;

creating, by the data management system, the target data storage entity in accordance with the set of data being compatible with the one or more constraints and the one or more properties of the source data storage entity, wherein creating the target data storage entity comprises creating a user account associated with the datastore managed by the data management system; and providing, by the data management system, the user with access to the target data storage entity based at least in part on creating the user account.

2. The method of claim 1, further comprising:

storing one or more identifiers associated with the target data storage entity in a migration database, wherein the migration database comprises a plurality of rows storing information associated with a plurality of ongoing migration processes for migrating data to a plurality of target data storage entities managed by the data management system.

3. The method of claim 1, wherein providing the user with access to the target data storage entity comprises:

providing the user with access to the target data storage entity for a threshold time period.

4. The method of claim 3, further comprising:

receiving, from the user of the data management system, a request for access to the target data storage entity, wherein providing the user with access to the target data storage entity is in response to the request for access.

5. The method of claim 3, further comprising:

initiating a timer based at least in part on receiving the request for access to the target data storage entity for the threshold time period, wherein the timer is set to terminate upon expiry of the threshold time period.

6. The method of claim 3, further comprising:

generating a tokenized uniform resource locator for accessing to the target data storage entity, wherein providing the user with access to the target data storage entity comprises outputting the tokenized uniform resource locator to the user, and wherein the tokenized uniform resource locator expires upon expiry of the threshold time period.

7. The method of claim 6, further comprising:

determining that the tokenized uniform resource locator was not accessed prior to expiry of the threshold time period; and deleting the target data storage entity based at least in part on determining that the tokenized uniform resource locator was not accessed prior to expiry of the threshold time period.

8. The method of claim 1, further comprising:

refraining from updating the set of data in the source data storage entity based at least in part on providing the user with access to the target data storage entity.

9. The method of claim 1, further comprising:

receiving a second request to migrate the set of data from the source data storage entity to the target data storage entity after providing the user with access to the target data storage entity; and transferring the set of data from the source data storage entity to the target data storage entity in response to the request to migrate.

10. The method of claim 1, further comprising:

performing, after the set of data has been stored to the target data storage entity, a statistical validation of the set of data as stored at the target data storage entity.

11. The method of claim 1, further comprising:

updating one or more metadata tables associated with the set of data after a migration of the set of data to the target data storage entity.

12. The method of claim 1, further comprising:

performing an integrity check associated with the set of data after the set of data has been stored to the target data storage entity, the integrity check based at least in part on a comparison of at least a portion of the set of data as stored at the target data storage entity to at least a portion of the set of data as stored at the source data storage entity.

13. The method of claim 1, wherein the one or more constraints associated with the target data storage entity comprises one or more operational constraints associated with the target data storage entity or one or more pricing constraints associated with the target data storage entity or both.

14. An apparatus, comprising:

one or more memories storing processor-executable code; and one or more processors coupled with the one or more memories and individually or collectively operable to execute the code to cause the apparatus to:

receive, by a data management system, a request from a user to migrate a set of data from a source data storage entity managed by the user to a target data storage entity in a datastore managed by the data management system;

verify, by the data management system, that the set of data from the source data storage entity is compatible with one or more constraints associated with the target data storage entity;

identify, by the data management system, one or more properties of the source data storage entity;

create, by the data management system, the target data storage entity in accordance with the set of data being compatible with the one or more constraints and the one or more properties of the source data storage entity, wherein creating the target data storage entity comprises creating a user account associated with the datastore managed by the data management system; and provide, by the data management system, the user with access to the target data storage entity based at least in part on creating the user account.

15. The apparatus of claim 14, wherein the one or more processors are individually or collectively further operable to execute the code to cause the apparatus to:

store one or more identifiers associated with the target data storage entity in a migration database, wherein the migration database comprises a plurality of rows storing information associated with a plurality of ongoing migration processes for migrating data to a plurality of target data storage entities managed by the data management system.

16. The apparatus of claim 14, wherein, to provide the user with access to the target data storage entity, the one or more processors are individually or collectively operable to execute the code to cause the apparatus to:

provide the user with access to the target data storage entity for a threshold time period.

17. The apparatus of claim 16, wherein the one or more processors are individually or collectively further operable to execute the code to cause the apparatus to:

receive, from the user of the data management system, a request for access to the target data storage entity, wherein the one or more processors are individually or collectively operable to execute the code to cause the apparatus to provide the user with access to the target data storage entity in response to the request for access.

18. The apparatus of claim 16, wherein the one or more processors are individually or collectively further operable to execute the code to cause the apparatus to:

initiate a timer based at least in part on receiving the request for access to the target data storage entity for the threshold time period, wherein the timer is set to terminate upon expiry of the threshold time period.

19. The apparatus of claim 16, wherein the one or more processors are individually or collectively further operable to execute the code to cause the apparatus to:

generate a tokenized uniform resource locator for accessing to the target data storage entity, wherein, to provide the user with access to the target data storage entity, the one or more processors are individually or collectively operable to execute the code to cause the apparatus to output the tokenized uniform resource locator to the user, and wherein the tokenized uniform resource locator expires upon expiry of the threshold time period.

20. A non-transitory computer-readable medium storing code, the code comprising instructions executable by one or more processors to:

receive, by a data management system, a request from a user to migrate a set of data from a source data storage entity managed by the user to a target data storage entity in a datastore managed by the data management system;

verify, by the data management system, that the set of data from the source data storage entity is compatible with one or more constraints associated with the target data storage entity;

identify, by the data management system, one or more properties of the source data storage entity;

create, by the data management system, the target data storage entity in accordance with the set of data being compatible with the one or more constraints and the one or more properties of the source data storage entity, wherein creating the target data storage entity comprises creating a user account associated with the datastore managed by the data management system; and provide, by the data management system, the user with access to the target data storage entity based at least in part on creating the user account.

* * * * *